United States Patent

Kim

[11] Patent Number: 5,828,425
[45] Date of Patent: Oct. 27, 1998

[54] APPARATUS FOR DECODING VIDEO DATA

[75] Inventor: Seong-bong Kim, Seoul, Rep. of Korea

[73] Assignee: Samsung Electronics Co., Ltd., Kyungki-Do, Rep. of Korea

[21] Appl. No.: 755,910

[22] Filed: Nov. 25, 1996

[30] Foreign Application Priority Data

Nov. 24, 1995 [KR] Rep. of Korea ................ 1995-43583

[51] Int. Cl.$^6$ ............................. H04N 7/24; H04N 7/30
[52] U.S. Cl. ......................... 348/845; 348/420; 348/423
[58] Field of Search ................................... 348/845, 423, 348/420; H04N 7/24, 7/30

[56] References Cited

U.S. PATENT DOCUMENTS 5,289,276  2/1994  Siracusa ................................ 348/469
5,349,070  9/1994  Retter .................................... 348/403
5,557,538  9/1996  Retter .................................... 348/402

FOREIGN PATENT DOCUMENTS 2 240 231  7/1991  United Kingdom ............ H04N 7/12

WO 95/32578  11/1995  WIPO .

*Primary Examiner*—Howard Britton
*Attorney, Agent, or Firm*—Sughrue, Mion, Zinn, Macpeak & Seas, PLLC

[57] ABSTRACT

An apparatus for decoding a video bitstream according to the MPEG standard. The decoder restores variable length decoded data at a processing speed required by high-speed systems, such as a high definition television system. The decoding apparatus includes a variable length decoder for variable length decoding the video bitstream and outputting header data and symbols obtained by the variable length decoding, a data distributor for receiving the output of the variable length decoder and alternately outputting the blocks of symbols via two output terminals, first and second restorers individually connected to the two output terminals of the data distributor for restoring the input symbols in response to an encoding indication signal for indicating whether each block is encoded, a header analyzer for receiving the header data form the variable length decoder and analyzing the received header data and outputting the encoding indication signal, and a macroblock formation unit for reconstructing blocks of the data restored by the first and second restorers into a macroblock.

15 Claims, 6 Drawing Sheets

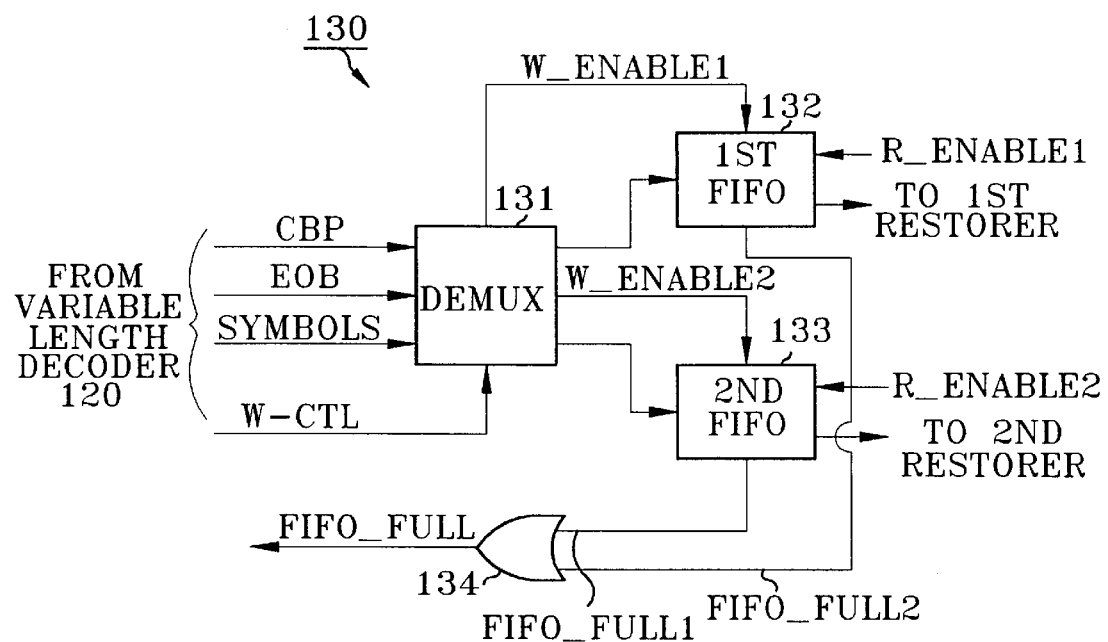

APPARATUS FOR DECODING VIDEO DATA

BACKGROUND OF THE INVENTION

The present invention relates to an apparatus for decoding a video bitstream. More particularly, the invention is directed to an apparatus for decoding an MPEG (Moving Pictures Experts Group) video bitstream via a plurality of paths on a real-time basis in systems, such as a high-definition TV (HDTV), which require high-speed processing for decoding macroblocks according to the MPEG video standard.

A system such as an HDTV, which performs high-speed data processing, requires a system clock of at least 100 Mhz in order to decode on a real-time basis an input bitstream including picture data for a relatively large picture size and corresponding header information. In addition, a system clock of 110–120 Mhz is required because of the type of interface between different components within the decoder.

However, when a decoder is implemented by using developed components, for example, off-the-shelf components, it is difficult to obtain stable decoding as well as to perform a decoding operation at such a high speed.

SUMMARY OF THE INVENTION

To solve the above and other problems, it is an object of the present invention to provide an apparatus for decoding a MPEG video bitstream via a plurality of paths.

It is a further object of the present invention to provide a decoding apparatus which can process a video bitstream according to the MPEG video standard on a real-time basis by decoding macroblocks via different decoding paths, thereby reducing the need for a very high system clock.

To accomplish the above and other objects of the present invention, there is provided an apparatus for decoding a video bitstream according to the MPEG standard. The decoding apparatus includes a variable length decoding means for variable length decoding of the video bitstream and outputting head data and symbols, a data distributor for receiving the output of the variable length decoding means and alternately outputting blocks of the symbols via two output terminals, first and second restoring means individually connected to the two output terminals of the data distributor for restoring the input symbols in response to an encoding indication signal for indicating whether each block is encoded, a header analyzer for receiving the header data from the variable length decoding means and analyzing the received header data and outputting the encoding indication signal, and macroblock formation means for reconstructing blocks of the data restored by the first and second restoring means into a macroblock.

BRIEF DESCRIPTION OF THE DRAWINGS

Preferred embodiments in accordance with the present invention are described with reference to the accompanying drawings wherein:

FIG. 2 is a detailed block diagram of a data distributor of the decoding apparatus of FIG. 1.

FIG. 3 is an illustration explaining a macroblock.

DETAILED DESCRIPTION OF A PREFERRED EMBODIMENT OF THE INVENTION

A preferred embodiment of the present invention will be described in detail with reference to the accompanying drawings.

Figure 1:
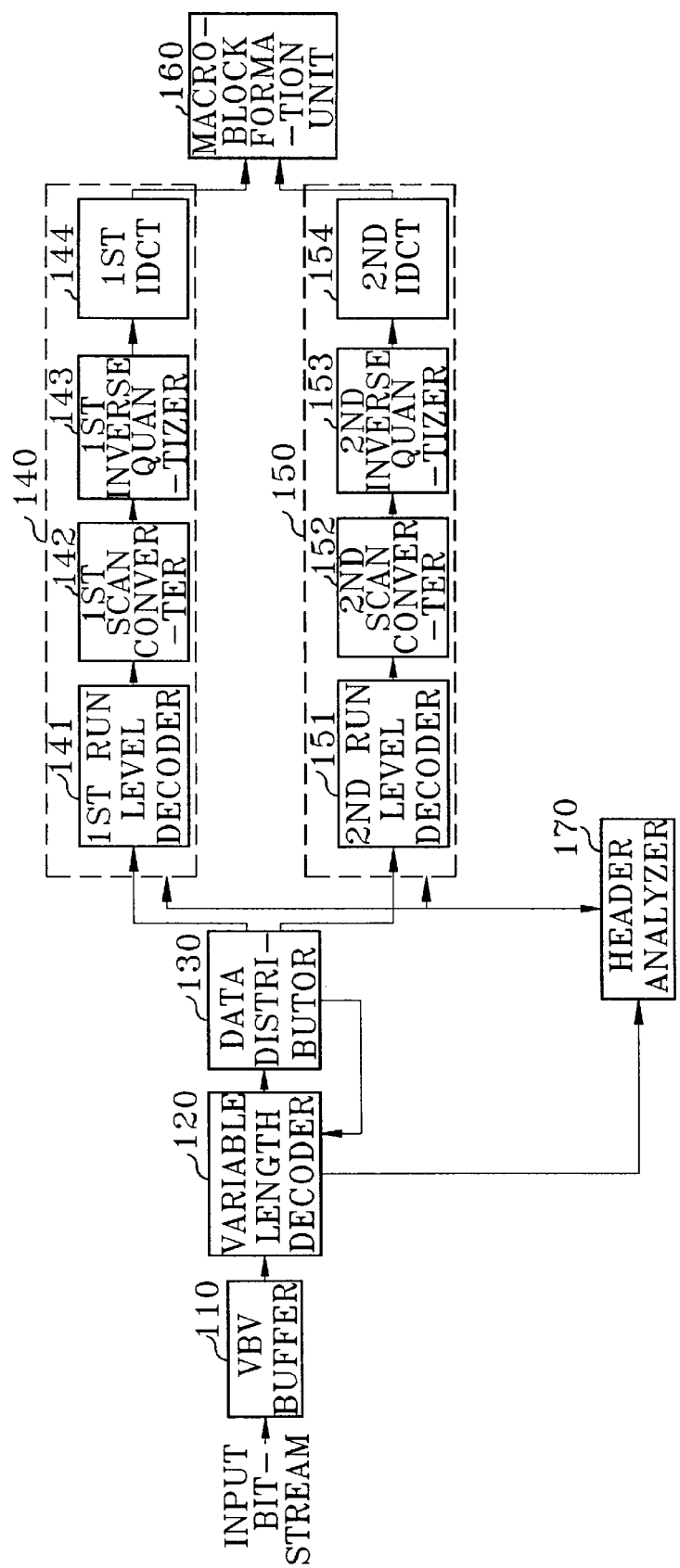
FIG. 1 is a block diagram of a decoding apparatus according to a preferred embodiment of the present invention.

FIG. 1 illustrates a decoding apparatus in accordance with a preferred embodiment of the present invention. The decoding apparatus includes a video buffering verifier (VBV) buffer 110, which receives an input video bitstream coded according to the MPEG-2 video standard. As the VBV buffer 110 is well known to those of ordinary skill in the art, a detailed description will be omitted for the sake of brevity. A variable length decoder 120 performs a variable length decoding operation with respect to the video bitstream output by the VBV buffer 110. The variable length decoder 120 supplies symbols and header data derived from the variable length decoding operation to a data distributor 130 and a header analyzer 170, respectively. The variable length decoder 120 also supplies a portion of the header data obtained from the input video bitstream to the data distributor 130. The data distributor 130 distributes blocks of symbols received from the variable length decoder 120 to a first restorer 140 and a second restorer 150 constituting a first and a second restoring path, respectively, on the basis of the header data. The header analyzer 170 analyzes the header data supplied from the variable length decoder 120 and outputs various control parameters necessary for restoring the data. Each of the first and second restorers 140 and 150 restores the symbols supplied from the data distributor 130 according to the control parameters output from the header analyzer 170, and then outputs the restored data to a macroblock formation unit 160. The macroblock formation unit 160 reconstructs the blocks of the received data into a macroblock.

A detailed description of the structure and operation of the decoding apparatus illustrated in FIG. 1 will be set forth with reference to FIGS. 2 through 7.

FIG. 2 illustrates a detailed block diagram of the data distributor 130. The data distributor 130 includes a demultiplexer 131 which receives the symbols and header data from the variable length decoder 120. More specifically, the demultiplexer 131 receives a coded block pattern (CBP) signal, an end of block (EOB) signal, the symbols, and a write control (W_CTL) signal, all of which are output from the variable length decoder 120. The CBP and the EOB signals are based on the MPEG video standard, and derived from the header data contained in the video bitstream received by the decoding apparatus. The CBP signal constitutes header data which is transmitted only in the encoded inter-macroblock, and indicates which block is encoded among the respective inter-macroblocks. The write control signal W_CTL is generated by the variable length decoder 120, and indicates when the data is valid for writing into the demultiplexer 131. The demultiplexer 131 uses the CBP signal, the EOB signal, and the write control signal in order to separate the blocks of input symbols.

More specifically, the demultiplexer 131 identifies blocks of the encoded symbols according to the CBP signal and the EOB signal. In particular, the demultiplexer 131 distributes the identified blocks to first and second first-in-first-out (FIFO) memories 132 and 133, based on the structure of the macroblock shown in FIG. 3.

FIG. 3 illustrates a macroblock relating to a 4:2:0 format of a picture. The macroblock is composed of six blocks, in which one macroblock is encoded in sequence with Y1, Y2, Y3, Y4, Cu and Cv. Here, Y1–Y4 represent luminance blocks, and Cu and Cv represent chrominance blocks. Therefore, the demultiplexer 131 supplies the blocks Y1, Y3 and Cu to the first FIFO memory 132, and supplies the blocks Y2, Y4 and Cv to the second FIFO memory 133. The demultiplexer 131 generates a first write enable signal W_ENABLE1 according to the write control signal when data is being transferred to the first FIFO memory 132, and generates a second write enable signal W_ENABLE2 according to the write control signal when data is being transferred to the second FIFO memory 133. The demultiplexer 131 also uses the above-described encoded block pattern (CBP) in order to prevent the symbols from being improperly distributed for blocks which are not encoded in the inter-macroblock.

The first FIFO memory 132 stores the symbols received together with the first write enable signal W_ENABLE1 from the demultiplexer 131, and the second FIFO memory 133 stores the symbols received together with the second write enable signal W_ENABLE2 from the demultiplexer 131. The first and second FIFO memories 132 and 133 output fullness signals FIFO_FULL1 and FIFO_FULL2 indicating data fullness to an OR gate 134, if the individually stored data exceeds a predetermined amount. The OR gate 134 logically sums the first and second fullness signals FIFO_FULL1 and FIFO_FULL2, and outputs the resultant fullness signal FIFO_FULL to the variable length decoder 120. The variable length decoder 120 judges data fullness of the first and second FIFO memories 132 and 133, based on the fullness signal FIFO_FULL, and accordingly controls the amount of data supplied to the demultiplexer 131. That is, if the fullness signal FIFO_FULL indicates that the first or second FIFO memory 132 or 133 is full, the variable length decoder 120 interrupts the data output to the data distributor 130. Meanwhile, if the fullness signal FIFO_FULL indicates that the first or second FIFO memory 132 or 133 is not full, the variable length decoder 120 supplies data to the data distributor 130.

Moreover, the first FIFO memory 132 outputs the stored data to the first restorer 140 if a first read enable signal R_ENABLE1 is applied from a first run level decoder 141. Similarly, the second FIFO memory 133 outputs the stored data to the second restorer 150 if a second read enable signal R_ENABLE2 is applied from a second run level decoder 142.

Figure 4:
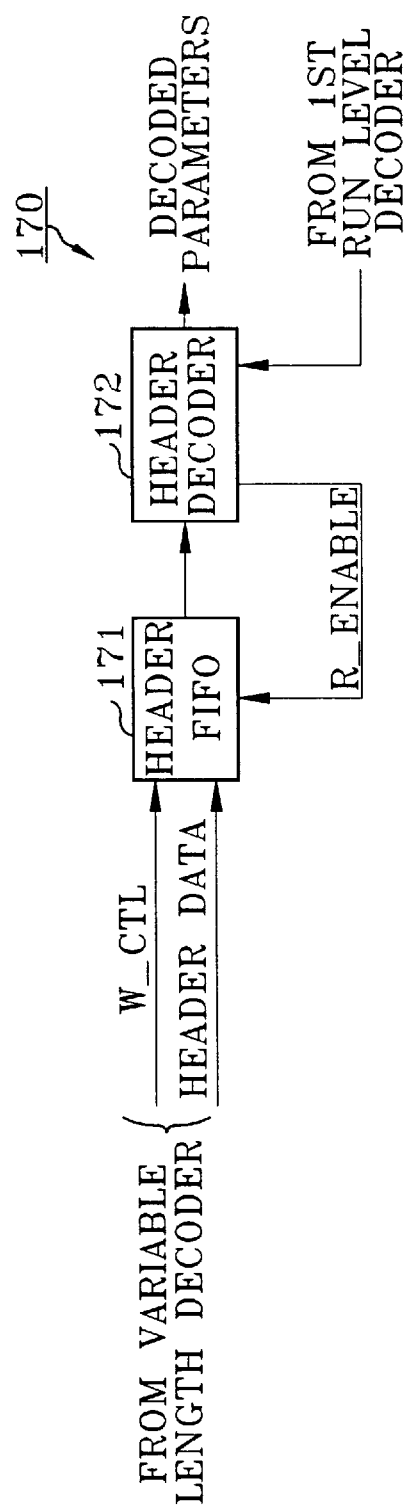
FIG. 4 is a detailed block diagram of a header analyzer of the decoding apparatus of FIG. 1.

The header analyzer 170 shown in FIG. 4 includes a header FIFO memory 171 and a header decoder 172. The header FIFO memory 171 stores header data received from the variable length decoder 120 in response to the write control signal W_CTL, and outputs the stored data in response to the read enable signal R_ENABLE. The header decoder 172 decodes the data output from the header FIFO memory 171 and generates a plurality of control parameters including an encoding indication signal and a scan type select signal ALT_SCAN. Here, the encoding indication signal PAT_CODE is used in decoding blocks of the symbols, and indicates whether each block within each macroblock has been encoded. The scan type select signal ALT_SCAN designates a zigzag scan or an alternate scan with respect to each block.

The header decoder 172 generates a read enable signal R_ENABLE at the time when a macroblock decoding start signal MB_START (FIG. 7) is generated, starts reading the header data corresponding to a macroblock MB(m+1), and stops generating the read enable signal R_ENABLE after the header data has been completely read. The header decoder 172 again generates a read enable signal R_ENABLE at the time when the next macroblock decoding start signal MB_START is generated, and reads the header data of the next corresponding macroblock MB(m+2). The header decoder 172 then decodes the header data read from the header FIFO memory 171.

Specifically, the header decoder 172 decodes the header data of the macroblock which precedes the data of the macroblock currently being restored by the first and second restorers 140 and 150. The header decoder 172 supplies the encoding indication signal PAT_CODE obtained by the decoding to the first and second restorers 140 and 150 whenever the macroblock decoding start signal MB_START is applied from the first run level decoder 141, as described more fully below. Therefore, the macroblock to be restored by the first and second restorers 140 and 150 precedes the macroblock corresponding to the macroblock decoding start signal MB_START.

Figure 5:
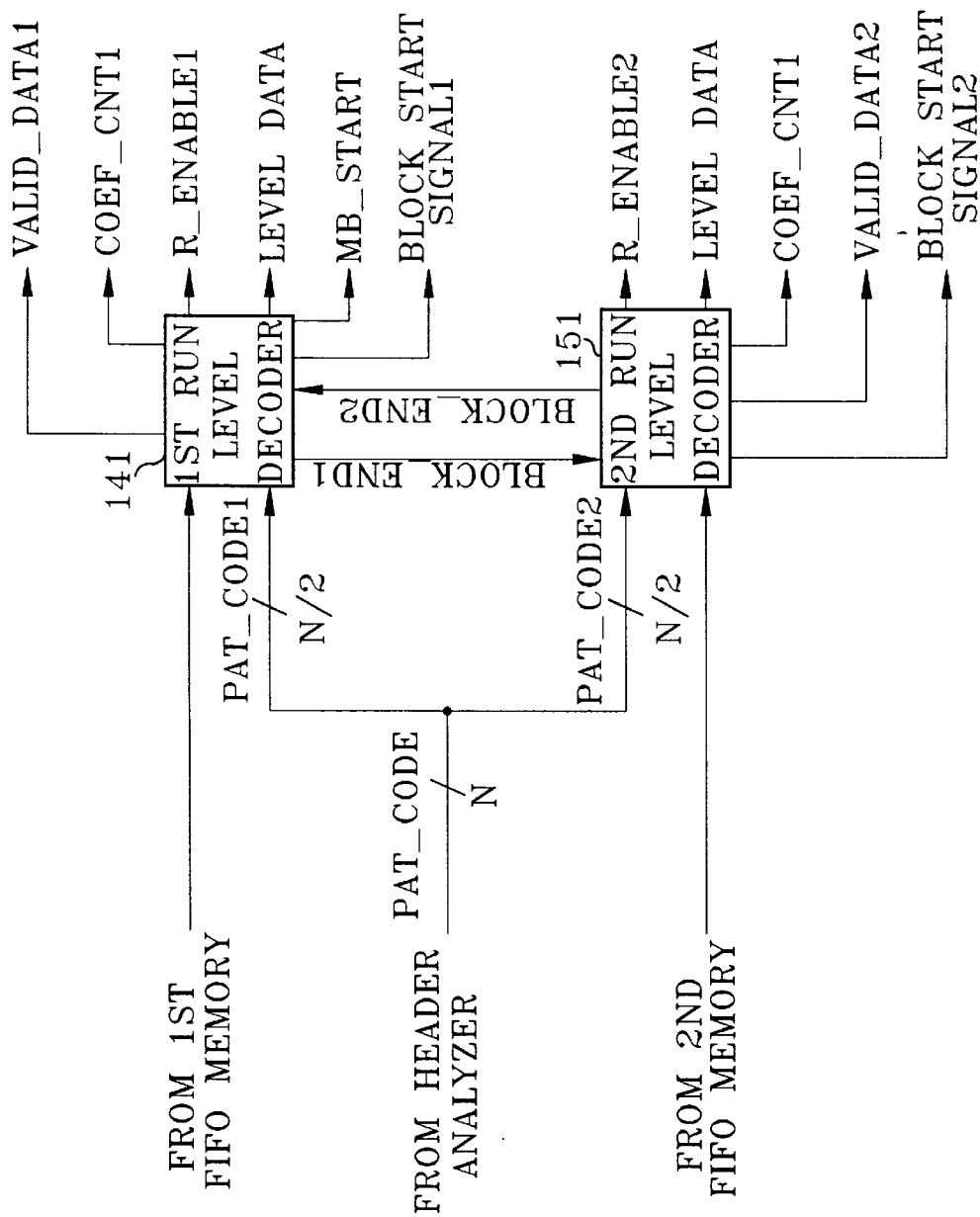
FIG. 5 is a detailed block diagram of run level decoders of the decoding apparatus of FIG. 1.

FIG. 5 is a detailed block diagram of the first and second run level decoders 141 and 151. If the encoding indication signal PAT_CODE output from the header analyzer 172 indicates that a block is an encoded block, the first and second run level decoders 141 and 151 perform run level decoding with respect to that block. The encoding indication signal PAT_CODE indicates the type of block, that is, an intra-macroblock, an inter-macroblock, a skipped macroblock, and a non-coded macroblock, and whether that block has been encoded. The encoding indication signal PAT_CODE has a bit value of "1" for an encoded block and a bit value of "0" for the non-encoded block. Such an encoding indication signal PAT_CODE is received via N bus lines from the header decoder 172, having a bus width that varies according to the data format of the macroblock. For example, the bus width is set to 6 bits in case of a 4:2:0 format, 8 bits in case of a 4:2:2 format, and 12 bits in case of a 4:4:4 format. Therefore, the first and second run level decoders 141 and 151 receive the encoding indication signals PAT_CODE1 and PAT_CODE2 via three bus lines, respectively.

Figure 7:
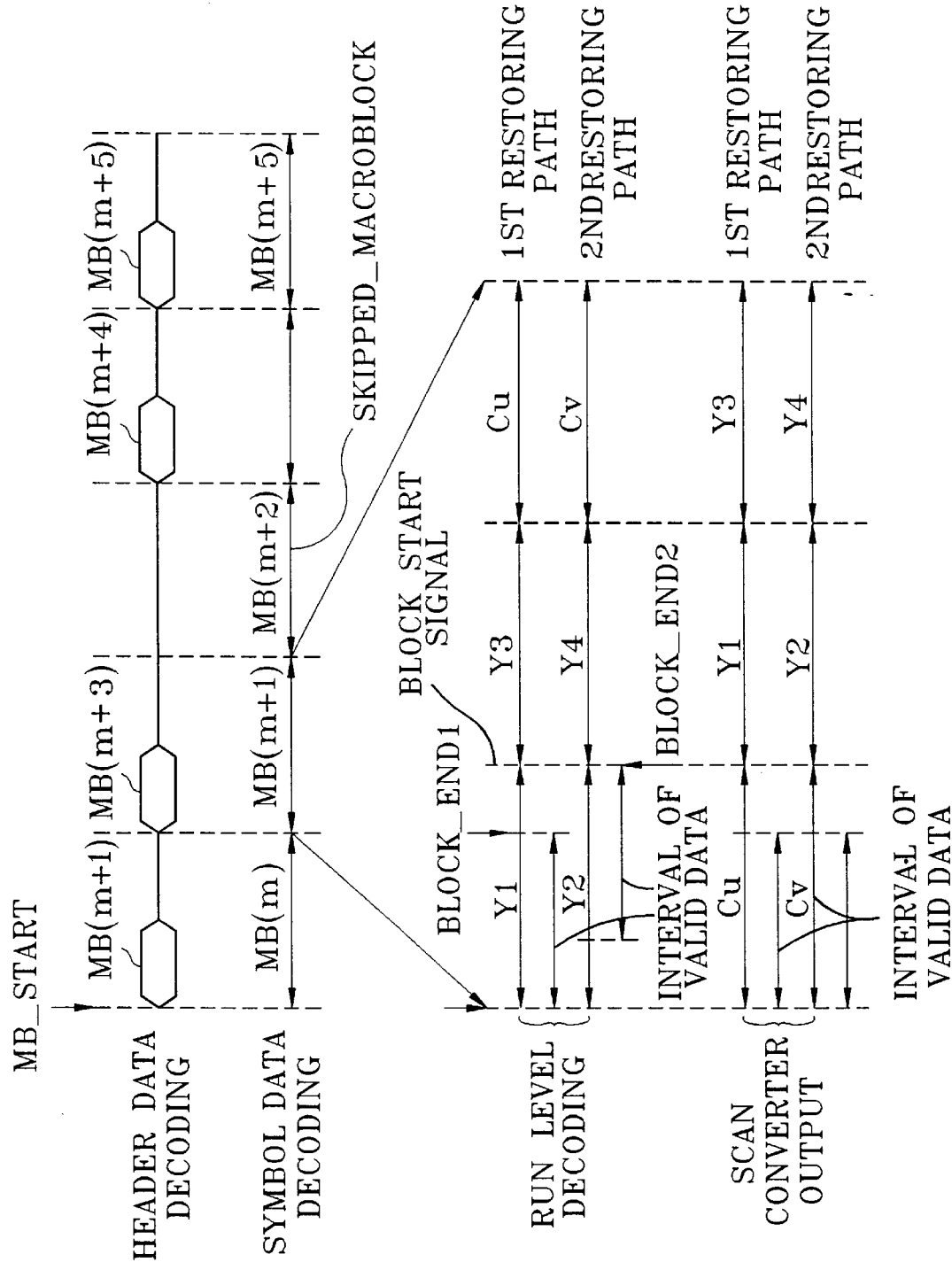
FIG. 7 is a timing diagram illustrating the operation of the decoding apparatus of FIG. 1.

The first and second run level decoders 141 and 151 generate a block start signal, based on the data received from the first and second FIFO memories 132 and 133, respectively, and start run level decoding with respect to each block based on the block start signal. The first and second run level decoders 141 and 151 commence run level decoding of the symbols of each block when the block start signal is generated, as shown in FIG. 7. However, the time of decoding with respect to each block is varied according to the amount of data stored in the first and second FIFO memories 132 and 133. As an example, when the second FIFO memory 133 is empty, the second run level decoder 151 does not start run level decoding in response to the block start signal, but rather awaits until the second FIFO memory 133 is filled with the symbols of one block before starting the run level decoding. Thus, the first and second run level decoders 141 and 151 complete the run level decoding at different points in time. Accordingly, the first and second run level decoders 141 and 151 generate block encoding end signals BLOCK_END1 and BLOCK_END2 indicating that run level decoding is completed with respect to the block of the input symbols, and give and take the generated block decoding end signals to and from each other respectively.

As illustrated in FIG. 7, the first and second run level decoders 141 and 151 generate the block start signals at the same time. As a result, valid data intervals with respect to the output of the scan converter coincide with one another. However, as an example, the run level decoding end points occur at different times. That is, as FIG. 7 shows, the block decoding end signals BLOCK_END1 and BLOCK_END2 in connection with the run level decoding are generated at different times. The first and second run level decoders 141 and 151 compare the generated block decoding end signal with the received block decoding end signal, and generate a block start signal for the next block based on the block decoding end signal at a point in time relatively later. The first run level decoder 141 generates a macroblock decoding start signal MB_START to be supplied to the header analyzer 170, based on the generation of the final block start signal with respect to each macroblock.

Operation of the first run level decoder 141 will be described with respect to the run level decoding. The first run level decoder 141 generates a first data valid signal VALID_DATA1 having a high-level state during the time when the run level decoded data is output, and down-counts (i.e., performs a down counting operation) the run data of each symbol. The first run level decoder 141 outputs to the first scan converter 142 the count value COEF_CNT1 when down-counting is being performed, and level data corresponding to the run data when the down-count is completed. The first run level decoder 141 also generates a first read enable signal R_ENABLE1 whenever the down-count with respect to each run data is completed, and the first FIFO memory 132 responding to the generated first read enable signal R_ENABLE1 supplies the next symbol data to the first run level decoder 141. This operation is performed in the same manner by the second run level decoder 151. The resultant second data valid signal VALID_DATA2, count value COEF_CNT1 and level data are output to the second scan converter 152. The second read enable signal R_ENABLE2 is transmitted to the second FIFO memory 133.

Figure 6:
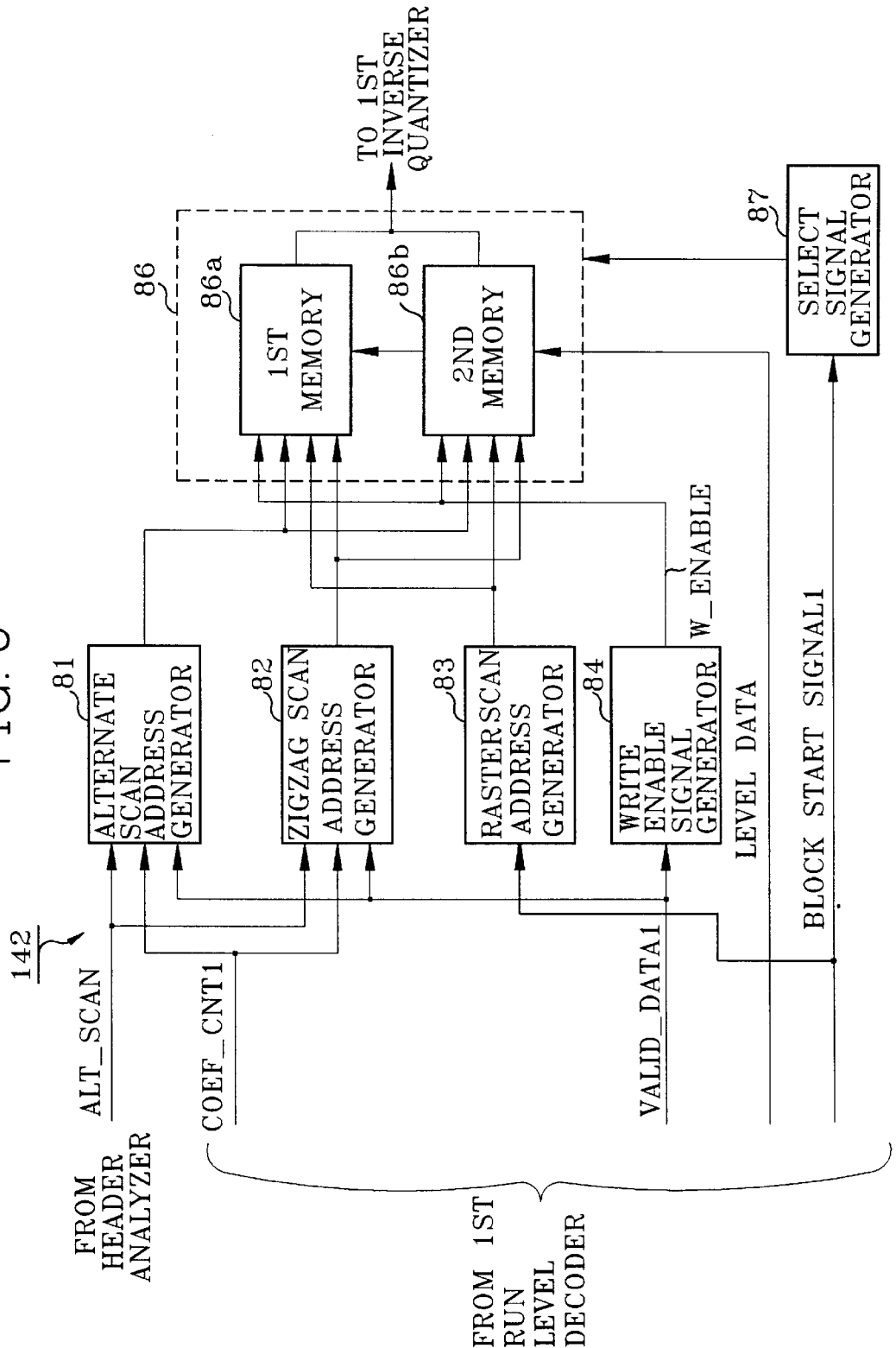
FIG. 6 is a detailed block diagram of a scan converter of the decoding apparatus of FIG. 1.

FIG. 6 is a detailed block diagram of a first scan converter 142 which receives the outputs of the first run level decoder 141. The first and second scan converters 142 and 152 have the same constitution as that shown in FIG. 6, and therefore a detailed description of only the first scan converter 142 will be provided.

In FIG. 6, an alternate scan address generator 81 and a zigzag scan address generator 82 receive the scan type select signal ALT_SCAN from the header decoder 172. The generators 81 and 82 are activated according to the value of the scan type select signal ALT_SCAN. If the first data valid signal VALID_DATA1 is applied to the alternate scan address generator 81, the zigzag scan address generator 81 or the zigzag scan address generator 82 generate scan addresses while the first data valid signal VALID_DATA1 is applied. As an example, if the value of the scan type select signal ALT_SCAN is "1," the zigzag scan address generator 82 generates scan addresses, and if the value thereof is "0," the alternate scan address generator 81 generates scan addresses. The enable signal generator 84 generates a write enable signal W_ENABLE and supplies the same to a memory bank 86. The block start signal is applied to a raster scan address generator 83 and a select signal generator 87. The select signal generator 87 generates a memory change signal CHANGE based on the received block start signal. A first memory 86a or a second memory 86b in the memory bank 86 stores the data or outputs the stored data according to the value of the memory change signal CHANGE, in which when the first memory 86a stores the input data, and the second memory 86b outputs the stored data. Also, if the value of the memory change signal CHANGE is changed, the operation is reversed. The first and second memories 86a and 86b are designed to have capacities of storing one block of the run level decoded data.

The alternate scan address generator 81 or the zigzag scan address generator 82 generates a memory write address for one block size, that is, the size of 8×8 pixels according to the scan type select signal ALT_SCAN and the count value COEF_CNT1. The first or second memory 86a or 86b is selected to perform a write operation according to the memory change signal of the select signal generator 87, and stores the level data supplied from the first run level decoder 141 according to the memory write address applied from the address generator 81 or 82. Finally, the first or second 86a or 86b stores "0" at the storage location corresponding to the count value COEF_CNT1, and stores the level data at the next storage location.

The raster scan address generator 83 increases an internal counter from 0 to 63 in response to the block start signal, to generate a read address, and repeats an up-counting operation and a read address generation operation starting from 0 if the count value reaches 63. The first or second memory 86a or 86b which receives the read address outputs the stored data to a first inverse quantizer 143.

Referring back to FIG. 1, a first inverse quantizer 143 and first inverse discrete cosine transformer (IDCT) 144 perform inverse quantization and inverse discrete cosine transformation in turn with respect to the output of the first scan converter 142, and output the resultant data to the macroblock formation unit 160. A second inverse quantizer 153 and a second inverse discrete cosine transformer (IDCT) 154 perform inverse quantization and inverse discrete cosine transformation in turn with respect to the output of the second scan converter 152, and output the resultant data to the macroblock formation unit 160. Since the operations of the inverse quantizers 143 and 153 and the IDCTs 144 and 154 are well known to those of ordinary skill in the art, a detailed description thereof will be omitted for the sake of brevity.

The macroblock formation unit 160 of FIG. 1 reconstructs the data supplied from the first and second IDCT units 144 and 154 into a prior-to-being-encoded video macroblock.

As described above, the apparatus for decoding the MPEG video bitstream via a plurality of paths restores the blocks constituting each macroblock using the header data contained in the video bitstream via a respectively different restoring path, and reconstructs the restored data into a macroblock size. A system such as a HDTV requiring a high-speed processing can process data on a real-time basis, and can synchronize the data which is separated into two paths for data restoration, based on the valid data, to thereby facilitate hardware implementation.

While only certain embodiments of the invention have been specifically described herein, it will apparent that numerous modifications may be made thereto without departing from the spirit and scope of the invention.

What is claimed is:

1. A decoding apparatus for decoding a video bitstream, said decoding apparatus comprising:

variable length decoding means for variable length decoding the video bitstream and outputting header data and symbols;

a data distributor for receiving the output of said variable length decoding means and alternately outputting blocks of said symbols via two output terminals;

first and second restoring means individually connected to one of said two output terminals of said data distributor for restoring the input symbols in response to an encoding indication signal;

a header analyzer for receiving said header data from said variable length decoding means and analyzing said header data and outputting said encoding indication signal in response thereto; and macroblock formation means for reconstructing blocks of said input symbols restored by said first and second restoring means into a macroblock.

2. The decoding apparatus according to claim 1, wherein said variable length decoding means comprises means outputting a block end signal together with said symbols, and said data distributor comprises a demultiplexer for alternately supplying blocks of said input symbols to said first and second restoring means based on said block end signal.

3. The decoding apparatus according to claim 2, wherein said data distributors comprises:

a first FIFO memory interposed between an output of said demultiplexer and an input of said first restoring means, for storing said symbols supplied from said variable length decoding means, said first FIFO memory generating a first data fullness signal when the amount of symbols stored therein exceeds a predetermined number;

a second FIFO memory interposed between an output of said demultiplexer and an input of said second restoring means, for storing said symbols supplied from said variable length decoding means, said second FIFO memory generating a second data fullness signal when the amount of symbols stored therein exceeds a predetermined number; and an OR gate logically summing said first and second data fullness signals, wherein said variable length decoding means temporarily interrupts data supply to said data distributor if the logically summed result of said OR gate indicates that one of said first and second FIFO memories is full.

4. The decoding apparatus according to claim 3, wherein said first restoring means decodes the symbols stored in said first FIFO memory based on an encoding indication signal and said second restoring means decodes the symbols stored in said second FIFO memory based on the encoding indication signal, and one of said first and second restoring means generates a macroblock decoding start signal for the next macroblock based on completion of the run level decoding with respect to the final block in each macroblock.

5. The decoding apparatus according to claim 4, wherein each of said restoring means comprises:

a run level decoder for down-counting run data corresponding to one of said symbols, outputting corresponding level data whenever the down-count is completed, reading a next symbol from said corresponding FIFO memory, and generating a block start signal indicating the start of decoding with respect to each block;

a write address generator for generating a write address in response to the down-count result of said run level decoding means;

a read address generator for generating a read address in response to the block start signal of said run level decoding means; and a memory for recording the level data output from said run level decoding means according to the write address of said write address generator and outputting the recorded level data according to the read address of said read address generator.

6. The decoding apparatus according to claim 5, wherein said read address generator generates read addresses for reading the data stored in said memory in response to the block start signal, and said memory stores the data value of "0" if the down-count result indicates that the down-count is proceeding, while said memory stores the level data supplied from said run level decoding means if the down-count result indicates that the down-count has been completed.

7. The decoding apparatus according to claim 4, wherein said header analyzer comprises:

a FIFO memory for storing the header data output from said variable length decoding means; and means for reading the header data of the corresponding macroblock from said FIFO memory and outputting said header data.

8. The decoding apparatus according to claim 1, wherein said video bitstream is encoded according to the MPEG video standard.

9. A method of decoding a video bitstream comprising the steps of:

decoding said video bitstream and outputting header data and symbols;

outputting alternating blocks of said symbols via two output terminals;

determining whether each of said blocks is encoded, and outputting an encoding indication signal for each block that is encoded;

restoring said blocks of symbols in response to said encoding indication; and reconstructing blocks of said symbols restored into a macroblock.

10. The method as defined by claim 9, further comprising the step of outputting a block end signal together with said symbols, and alternately supplying blocks of said input symbols to said two output paths to be restored.

11. The method as defined by claim 10, further comprising the steps of storing said symbols in one of first and second FIFO memories; generating a data fullness signal when at least one of said first and second FIFO memories is full; and controlling the supply of data to said two output terminals in accordance with said data fullness signal.

12. The method as defined by claim 11, further comprising the step of run level decoding the symbols stored in said first and second FIFO memories based on an encoding indication signal; and generating a macroblock decoding start signal for a next macroblock based on completion of the run level decoding with respect to the final block in each macroblock.

13. The method as defined by claim 12, further comprising the step of down-counting run data corresponding to one of said symbols; outputting corresponding level data whenever the down-count is completed, reading a next symbol from one of said first and second FIFO memories, generating a block start signal indicating the start of decoding with respect to each block; generating a write address in response to the down-count operation; generating a read address in response to the block start signal; and recording the level data according to the write address in a memory and outputting the recorded level data according to the read address.

14. The method as defined by claim 13, further comprising the step of reading the data stored in said memory in response to the block start signal, wherein said memory stores the data value of "0" if the down-count result indicates that the down-count is proceeding, while said memory stores the level data if the down-count result indicates that the down-count has been completed.

15. The method as defined by claim 9, wherein said video bitstream is encoded according to the MPEG video standard.

* * * * *